US006636407B1

(12) United States Patent
Ryman

(10) Patent No.: US 6,636,407 B1
(45) **Date of Patent: *Oct. 21, 2003**

(54) BROADBAND SURGE PROTECTOR FOR RF/DC CARRYING CONDUCTOR

(75) Inventor: Henry G. Ryman, Orland Park, IL (US)

(73) Assignee: Andrew Corporation, Orland Park, IL (US)

( * ) Notice: Subject to any disclaimer, the term of this patent is extended or adjusted under 35 U.S.C. 154(b) by 418 days.

This patent is subject to a terminal disclaimer.

(21) Appl. No.: 09/660,759

(22) Filed: Sep. 13, 2000

(51) Int. Cl.[7] .......... H02H 1/00

(52) U.S. Cl. .......... 361/119; 361/56; 361/58; 361/113

(58) Field of Search .......... 361/119, 56, 58, 361/120, 127, 113

(56) References Cited

U.S. PATENT DOCUMENTS

| | | | | |
|---|---|---|---|---|
| 3,289,117 | A | 11/1966 | Kearns et al. | 333/73 |
| 3,323,083 | A | 5/1967 | Ziegler, Jr. | 333/97 |
| 3,663,901 | A | 5/1972 | Forney, Jr. | 333/97 |
| 3,886,411 | A | 5/1975 | Klayum | 317/62 |
| 4,046,451 | A | 9/1977 | Juds et al. | 339/177 |
| 4,359,764 | A | 11/1982 | Block | 361/119 |
| 4,409,637 | A | 10/1983 | Block | 361/119 |
| 4,525,690 | A | 6/1985 | De Ronde | 333/116 |
| 4,544,984 | A | 10/1985 | Kawanami et al. | 361/119 |
| 4,554,608 | A | 11/1985 | Block | 361/119 |
| 4,633,359 | A | 12/1986 | Michelson et al. | 361/119 |
| 4,985,800 | A | 1/1991 | Feldman et al. | 361/113 |
| 5,508,873 | A | 4/1996 | Knapp et al. | 361/119 |
| 5,712,755 | A | 1/1998 | Glaser et al. | 361/119 |
| 5,724,220 | A | 3/1998 | Chaudhry | 361/119 |
| 5,936,822 | A | 8/1999 | Bazarian | 361/117 |
| 5,982,602 | A | 11/1999 | Tellas et al. | 361/119 |
| 6,452,773 | B1 * | 9/2002 | Aleksa et al. | 361/119 |

FOREIGN PATENT DOCUMENTS

| | | | |
|---|---|---|---|
| CA | 2262124 | 8/1999 | H02H/9/04 |
| CH | 660261 A5 | 3/1987 | H01T/4/02 |
| WO | WO95/10116 | 4/1995 | H01C/7/10 |
| WO | WO99/19957 | 4/1999 | H02H/3/22 |

* cited by examiner

*Primary Examiner*—Stephen W. Jackson
(74) *Attorney, Agent, or Firm*—Jenkins & Gilchrist

(57) ABSTRACT

A surge protector includes a coaxial through-section having a first inner conductor and a first outer conductor and a stub having a second inner conductor and a second outer conductor. The stub has a first end and a second end, the stub being coupled to the coaxial through-section, wherein the second inner conductor is conductively coupled to the first inner conductor at the first end of the stub and the second outer conductor is conductively coupled to the first outer conductor at the first end of the stub. The second inner conductor is substantially hollow and has at least one helical aperture disposed therein. A charge elimination device is conductively coupled between the second inner conductor and a grounding device. A radio frequency short circuit bypass is electrically coupled between the second inner conductor and the second outer conductor.

27 Claims, 2 Drawing Sheets

BROADBAND SURGE PROTECTOR FOR RF/DC CARRYING CONDUCTOR

FIELD OF THE INVENTION

This invention is directed generally to surge protectors, and, more particularly, relates to a broadband surge protector for use in high frequency communications systems.

BACKGROUND OF THE INVENTION

A surge protector is a device placed in an electrical circuit to prevent the passage of dangerous surges and spikes that could damage electronic equipment. One particularly useful application of surge protectors is in the antenna transmission and receiving systems of wireless communications systems. In such antenna systems, a surge protector is generally connected in line between a main feeder coaxial cable and a jumper coaxial cable. During normal operation of the antenna system, microwave and radio frequency signals pass through the surge protector without interruption. When a dangerous surge occurs in the antenna system, the surge protector prevents passage of the dangerous surge from one coaxial cable to the other coaxial cable by diverting the surge to ground.

One type of surge protector for antenna systems has a tee-shaped configuration including a coaxial through-section and a quarter-wave stub connected perpendicular to a middle portion of the coaxial through-section. One end of the coaxial through-section is adapted to interface with a mating connector at the end of the main feeder coaxial cable, while the other end of the coaxial through-section is adapted to interface with a mating connector at the end of the jumper coaxial cable. Both the coaxial through-section and the stub include inner and outer conductors.

At the tee-shaped junction between the stub and the coaxial through-section, the inner and outer conductors of the stub are connected to the respective inner and outer conductors of the coaxial through-section. At the other end of the stub, the inner and outer conductors of the stub are connected together creating a short. The short is indirectly connected to a grounding device, such as a grounded buss bar, by a clamp. The physical length from the junction at one end of the coaxial stub and the short at the other end of the coaxial stub is approximately equal to one-quarter of the center frequency wavelength for a desired narrow band of microwave or radio frequencies.

During normal "non-surge" operation, a quarter-wave shorted stub surge protector of the above-described type permits signals within the frequency band to pass through the surge protector between the two cables connected thereto, in either direction. The direction of signal travel depends upon whether the surge protector is used on the transmission side or receiving side of an antenna system. Signals within the desired band of operating frequencies pass through one of the interfaces (depending on the direction of signal travel) to the surge protector. When passing through the surge protector, signals within the desired frequency band travel through the coaxial through-section of the surge protector.

A portion of the desired signal, however, encounters the stub while passing through the coaxial through-section. The stub scatters this signal portion which causes this signal portion to travel down the stub. After reflecting off the short, the scattered signal portion returns along the stub. Because the physical length of the stub from the junction with the inner conductor of the coaxial through-section to the short is designed to be equal to one-quarter of the center frequency wavelength for the desired band of operating frequencies, the scattered signal portion adds in phase to the non-scattered signal portion and passes through to the other end of the coaxial through-section.

When a surge occurs in the antenna system (e.g. from a lightning strike), the physical length of the stub is much shorter than one-quarter of the center frequency wavelength because the surge is at a much lower frequency than the desired band of operating frequencies. In this situation, the surge travels along the inner conductor of the coaxial through-section to the stub, through the stub to the short, through the short to the grounding attachment, and through the grounding attachment to a grounding device attached thereto. Thus, the surge is diverted to ground by the surge protector.

A drawback of the above quarter-wave stub surge protectors is that these surge protectors have a limited operating bandwidth. Original equipment manufacturers ("OEM") and wireless service providers are currently required to purchase a multitude of shorted stub surge protectors to address all of the various applications that operate at different frequencies. Since there is an increasing preference towards shorted stub surge protectors because of their multiple strike capabilities and superior passive intermodulation distortion performance, an OEM or service provider would have to stock and inventory a multitude of different shorted stub surge protectors for the common allocated operating bandwidths of today's systems (800–870 MHz, 824–896 MHz, 870–960 MHz, 1425–1535 MHz, 1700–1900 MHz, 1850–1990 MHz, 2110–2170 MHz, 2300–2485 MHz, etc.). A broadband shorted stub surge protector that can operate over this entire frequency range would allow an OEM or service provider to carry one product; obviously, simplifying inventory requirements and offering the cost advantages leveraged in higher volume purchases.

Additionally, there is a significant need for a broadband surge protector because there is an increasing amount of pressure from society to limit the number of cell sites associated with wireless communications systems. Towards this end, there is an increasing need for wireless service providers to co-locate their operating systems employing diplexing and triplexing techniques via the existing coaxial transmission lines. This trend of multiplexing various operating frequencies has made it essential for all traditional narrowband components, such as surge protectors, to be upgraded to broadband devices.

While other types of broadband surge protectors are available being manufactured today, many employ a technique of installing a gas discharge tube between the inner and outer conductors of the coaxial surge device. While these types of devices offer broadband performance, they suffer from several undesirable features including the need for regular scheduled maintenance, the inability to withstand multiple strikes, and poor passive intermodulation distortion performance.

Accordingly, there exists a need for a surge protector which has a broad operating bandwidth for use in wireless communications systems.

In the prior application of Aleksa et al., U.S. Ser. No. 09/531,398, filed Mar. 28, 2000, a broadband shorted stub type surge protector is described. This copending application is commonly owned with the present application. In the surge protector device described in the copending application, the stub has a hollow inner conductor which has a helical through aperture. This results in a higher impedance and a lower Q and, therefore, increased bandwidth of the shorted stub. However, the prior art shorted stub conductors, including the broadband conductor of the above-referenced copending application act as a short to ground for low frequency and DC signals. In some applications, it is desired to pass DC through the coaxial conductor as well as the radio frequency signals. Specifically, when so-called "active" antennas are utilized, it is desired to carry DC power to the antennas through the same cable as the radio frequency signals. Briefly, active antennas are those in which electronic circuit components such as amplifiers, and the like are included on the tower closely adjacent the antenna. These electronic components require a source of DC power. In order to avoid the additional expense of running a second DC cable to provide power for these components, it is desirable to provide DC power in the same cable as the radio frequency communications signals. However, the surge arrestors in accordance with the prior art do not permit DC and other low frequency power to pass, since they provide a short to ground for low frequencies including DC.

OBJECTS AND SUMMARY OF THE INVENTION

Accordingly, it is an object of the present invention to provide a relatively broadband width surge protector which permits both RF signals and DC current to be carried on the protected conductor or cable.

In one embodiment of the invention, the foregoing object is realized by providing a surge protector comprising a surge protector, comprising a coaxial through-section having a first inner conductor and a first outer conductor, a stub having a second inner conductor and a second outer conductor, the stub having a first end and a second end, the stub being coupled to the coaxial through-section, wherein the second inner conductor is conductively coupled to the first inner conductor at the first end of the stub and the second outer conductor is conductively coupled to the first outer conductor at the first end of the stub, the second inner conductor being substantially hollow and having at least one helical aperture disposed therein, a charge elimination device conductively coupled between said second inner conductor and a grounding device, and a radio frequency short circuit bypass electrically coupled between said second inner conductor and said second outer conductor.

BRIEF DESCRIPTION OF THE DRAWINGS

Other objects and advantages of the invention will become apparent upon reading the following detailed description in conjunction with the drawings in which.

DETAILED DESCRIPTION OF THE ILLUSTRATED EMBODIMENT

Figure 1:
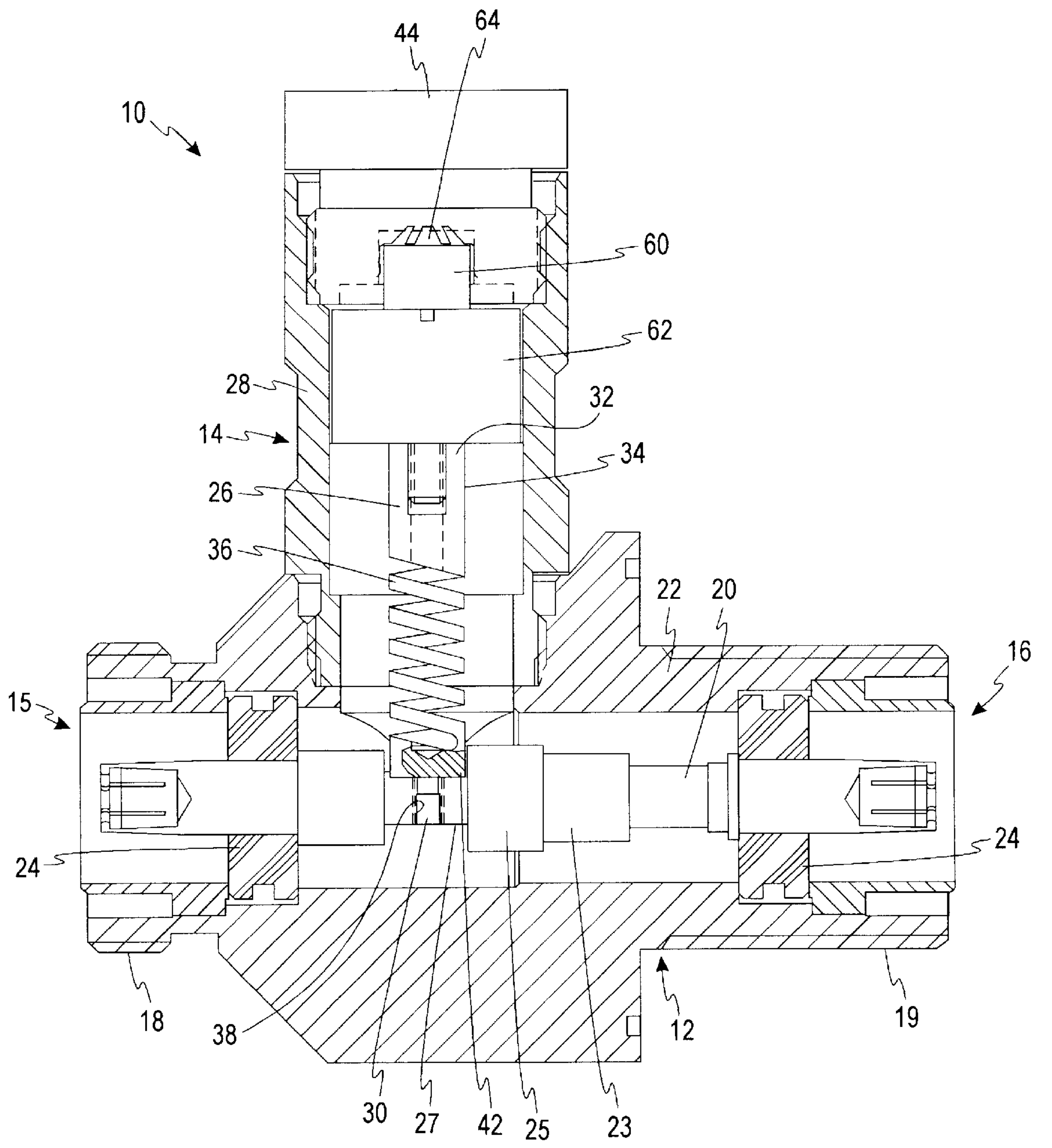
FIG. 1 is a side elevation, partially in section, of a broadband surge protector according to one embodiment of the present invention.

Referring now to the drawings, FIG. 1 illustrates an assembled broadband surge protector 10 for use in a high frequency wireless communications system in which the cable or conductor to be protected carries both radio frequency (RF) signals and DC power. The surge protector 10 has a coaxial through-section 12 and a stub 14 disposed substantially perpendicular to the coaxial through-section 12. A first end 15 and a second end 16 are coupled to a first coaxial cable and second coaxial cable (not shown), respectively, in a high frequency wireless communication system. The stub is coupled to a grounding device (not shown). A coaxial cable of the type which is used in high frequency wireless communications systems may be used in conjunction with the present invention.

Figure 2:
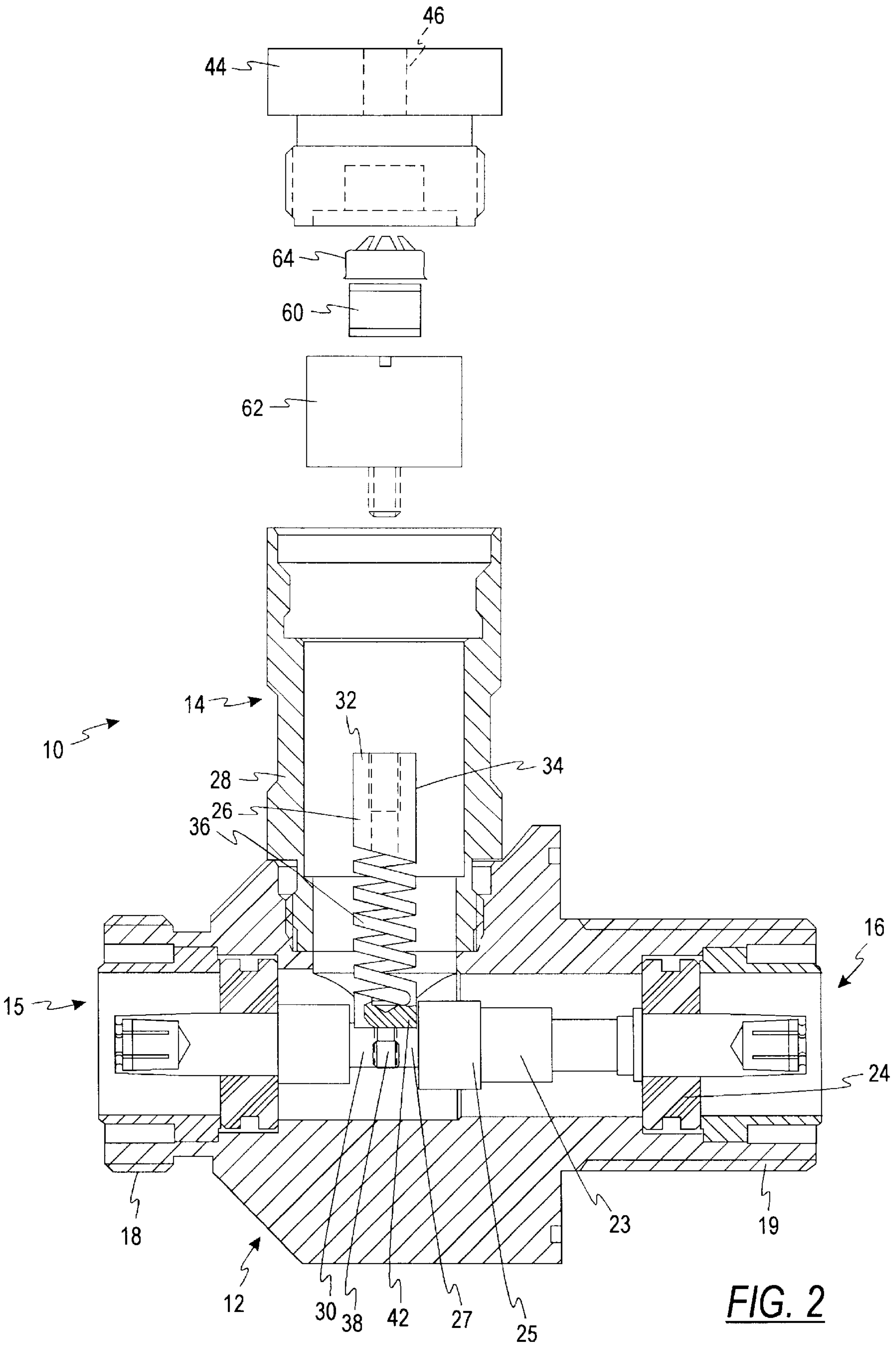
FIG. 2 is a partially exploded view of the protector of FIG 1.

Referring also to FIG. 2, the broadband surge protector 10 has a first connector 18 and a second connector 19 disposed at the first and second ends 15,16, respectively, for coupling the surge protector 10 to first and second cables in the system. One of these first and second cables, in one embodiment, may be coupled with ground-based equipment connected with a tower mounted antenna or antennas. The other of these cables may run up the tower to the antennas and related electronics, carrying both radio frequency (RF) communication signals to and from the antennas and associated electronics, and also DC power for powering the electronics. Further details of suitable connectors which may be used in conjunction with the surge protector 10 illustrated in FIGS. 1 and 2 are disclosed in commonly-owned U.S. Pat. No. 5,982,602 entitled "Surge Protector Connector" and U.S. Pat. No. 4,046,451 entitled "Connector for Coaxial Cable with Annularly Corrugated Outer Conductor."

The coaxial through-section 12 has an inner conductor 20 spaced insulated from an outer conductor 22 by dielectric spacers 24. The inner conductor 20 defines the longitudinal axis of the coaxial through-section. The stub 14 has an inner conductor 26 and an outer conductor 28. The inner and outer conductors 20, 22 of the coaxial through-section 12 are conductively connected to the inner and outer conductors 26,28 of the stub 14, respectively.

The inner or outer conductor 20 may further be tuned by utilizing one or more increased and/or decreased diameter segments 23, 25, 27, for example.

One of the aforementioned drawbacks of the traditional tee-shaped quarter wave shorted stub surge protectors ("traditional QWS") is that these surge protectors have a limited operating bandwidth. However, in high frequency wireless communications systems, for example, the microwave and/or radio signals have frequencies ranging from approximately 800 MHz to 2500 MHz. As many as ten traditional QWS may be required to cover this frequency range. The bandwidth of a traditional QWS can be increased by increasing the impedance of the stub. For example, a traditional QWS designed for a center resonant frequency of 870 MHz has a theoretical 20 dB return loss bandwidth of 155 MHz when the stub impedance is 35 ohms. The same traditional QWS with a resonant center frequency of 870 MHz has a theoretical 20 dB return loss bandwidth of 226 MHz when the impedance is 50 ohms. Continuing, the same traditional QWS with a resonant center frequency of 870 MHz will have a theoretical 20 dB return loss bandwidth of 580 MHz when the impedance is 150 ohms. This effect of increasing the stub impedance of a traditional QWS is illustrated in FIG. 6.

Increasing the impedance of the stub of a traditional QWS provides a broader bandwidth. A higher stub impedance can be achieved by either decreasing the diameter of the inner conductor of the stub or increasing the diameter of the outer conductor of the stub. However, both of these methods have significant consequences. Decreasing the diameter of the stub inner conductor compromises the current carrying capability of the stub. This is analogous to the fusing concept of a metallic conductor. Therefore, there is a strict limitation and performance trade-off associated with decreasing the stub center conductor diameter. Increasing the diameter of the outer conductor of the stub results in a larger sized surge protector which translates into an increased cost of the device. This also is an undesirable solution.

The effectiveness of a surge protector is characterized by the throughput energy which is a measure of the amount of energy which passes through to the output of the surge protector when the input of the surge protector is subjected to a surge (e.g. a lightning transient waveform). Commonly in industry, a lightning transient waveform is modeled as a current waveform consisting of an eight microsecond rise time (from 10% to 90% peak value) and a twenty microsecond decay time (down to 50% peak value) with an amplitude level that may vary from 2000 amperes peak current to as much as 20,000 amperes peak current. The specific amplitude depends on where the surge protector is installed as well as the anticipated exposure levels of transient activity. The throughput energy can be calculated by applying the input current surge, recording the residual output voltage waveform, and integrating the square of this residual voltage waveform over the duration of the surge event. Dividing this value by the load impedance will provide a numerical value (expressed in Joules) for the throughput energy. The residual voltage waveform is proportional to the inductance of the stub, is proportional to the change in current during the rise time, and is inversely proportional to the rise time of the applied current waveform. The inductance of the stub can be manipulated to reduce throughput energy. For a traditional QWS, the self-inductance of the stub can be approximated by the following expression.

$$L_{inductance}(\mu H) = \frac{0.508}{10^2}\left[\left(2.303\cdot\log\left(\frac{2\cdot Length}{Width + Thickness}\right) + 0.5 + 0.2235\frac{(Width + Thickness)}{Length}\right)\right]$$

Where Length, Thickness, and Width represent the length, thickness, and width of the stub. As can be seen from the above expression, reducing the length of the stub results in a reduction in inductance which translates into a reduction in throughput energy. Accordingly, it is desirable to reduce the length of the stub to reduce the throughput energy of the surge protector. The stub length can be reduced by adding a dielectric material to increase the effective dielectric constant between the inner and outer conductors of the stub. However, reducing the effective stub length in this manner also has the undesirable effect of lowering the impedance of the stub which narrows the operating bandwidth of the surge protector.

The inventors of the above-referenced copending application of Aleksa et al. found that adding a very small amount of series inductance to a stub can result in a unique broad banding effect to increase the frequency operating range of the surge protector. However, because the addition of series inductance to the stub results in a compromise in throughput energy performance, it is preferable to reduce the overall length of the stub to maintain lower throughput energy values. Because it is difficult to add series inductance in a concentrated fashion, the reduction in overall length can be achieved by distributing the inductance over the length of the stub. The inductance can be selectively distributed over a significant portion of the stub by making the stub's inner conductor hollow and providing a helical aperture through the outer wall of the inner conductor. In other words, the inner conductor of the stub is in the form of a hollow cylinder having a helical aperture formed therein.

The result is the broadband surge protector 10 having an inner conductor 26 as illustrated in FIGS. 1 and 2. In the illustrated embodiment of the inner conductor 26 of the stub 14 has an input end 30 and an output end 32. The input end 30 of the stub 14 is coupled to the inner conductor 20 of the coaxial through-section. The inner conductor 26 is hollow from substantially the input end through the output end. The inner conductor 26 has an outer diameter $\phi$ of approximately 0.270 inch. The outer wall 34 of the hollow inner conductor 26 has a thickness t of approximately 0.070 inch. The inner conductor 26 has a length L of approximately 1.221 inches.

The hollow inner conductor 26 has an aperture 36 continuously helically disposed within its outer wall 34. The helical aperture 36 begins at a distance $D_1$ of 0.110 inch from the input end of the inner conductor and terminates at a distance $D_2$ of approximately 0.500 inch from the output end 32 of the inner conductor 36. The continuous helical aperture 36 has a width W of approximately 0.030 inch and makes about five revolutions around the inner conductor 26. The helical aperture 36 is designed to maintain a cross-sectional area capable of carrying of at least twenty kilo-amperes surge current without degradation, fusing, or arcing. The helical aperture 36 can be machined in an efficient manner using modern computer numerically controlled machining centers. The dimensions of the stub 14 allow the surge protector 10 to be interchangeable with many surge protectors currently being used in high frequency wireless communications systems. The dimensions given are of one embodiment only. The stub may have other dimensions for other applications without departing from the invention.

The input end 30 of the inner conductor 26 includes an integral externally threaded member 38 for coupling the inner conductor 26 of the stub 14 to the inner conductor 20 of the coaxial through-section 12. The inner conductor 20 of the coaxial through-section 12 contains a corresponding tapped aperture. The inner conductor 26 is hollow from substantially the input end 30 through the output end 32. At the input end 30, the inner conductor is not hollow for a small length providing a base 42 for the externally threaded member 38.

In order to permit the coaxial through section 12 to carry DC power, as mentioned above, the stub 14 is not coupled to a DC ground. Rather, the inner conductor 26 is coupled with a surge arrestor 60 which in the illustrated embodiment is a gas tube type of arrestor. Other types of surge arrestors or charge elimination devices might be utilized without departing from the invention. A radio frequency (RF) short circuit or RF bypass is provided by a capacitance which is provided between the center conductor 26 and the grounded outer conductor 28 of the stub 14. This capacitance takes the form of a generally tubular or hollow cylindrical conductive member 62 of slightly smaller outer diameter than the inner diameter of outer conductor 28. This cylinder 22 has a dielectric outer coating, such that its outer surface defines a capacitor or capacitance with the facing surrounding inner surface of the stub outer conductor 28. This capacitance thus forms an RF short circuit to ground, by passing the gas tube or other charge eliminating device or surge arrestor 60. The radio frequency short circuit or bypass permits the radio frequency signals to reflect off the short and return along the stub to add to the non-scattered signal portion, in much the same fashion as prior art surge protectors described hereinabove. At the same time, the gas tube or other charge elimination device provides a discharge to ground for lightning or other similar over current or over voltage conditions. In this regard, a free end of the gas tube 60 is provided with a spring clip 64 which makes electrically conductive contact with a grounding cap attached to the free outer end of the stub 14 as described hereinbelow.

Referring back to FIG. 1, a grounding cap 44 is conductively coupled to the gas tube 60 and the outer conductor 28 at the output end of the stub 14 in order to create a path to ground out a surge. The gas tube 60 mounts a spring-finger socket 64 which bears against the grounding cap 44. To ground the surge passing through the cap 14, the cap 44 is provided with a grounding attachment 46 for coupling the cap 44 to ground. In the illustrated embodiment, the grounding attachment 46 is an internally threaded aperture to couple the cap 44 to a grounding device having a corresponding threaded member. The grounding cap 44 also grounds the outer conductor 28 to complete the RF short circuit bypass for the bypass capcitance found by the cylinder 62, as described above.

The broadband surge protector 10 of the present invention possesses multi-strike capabilities. Because the radio frequency signals bypass the gas tube or other charge elimination device 60, essentially only DC or other low frequency energy is carried by this device. Therefore, the problems which have arisen in other surge protectors wherein RF signal is applied to a charge elimination device such as a gas tube, metal oxide varistor silicon avalanche diode or the like, including the generation of intermodulation distortion products, generally does not occur with the construction of the present invention. One embodiment of the broadband surge protector 10 is able to withstand at least one hundred directly applied surges to the inner conductor of the surge protector at a level of twenty kilo-amperes without any physical or electrical degradation. Similarly, the surge protector 10 is constructed such that it is not polarized, therefore, the device can be installed in either orientation without compromising any electrical, mechanical, or environmental performance.

The broadband surge protector 10 is constructed to withstand severe environmental and mechanical conditions. For example, in one embodiment of the present invention, the broadband surge protector 10 is constructed to withstand at least twenty-four hours of one meter water immersion without any moisture ingress or performance degradation. In an alternative embodiment, the broadband surge protector 10 is constructed to withstand twenty-four hours of vibration testing in three planes with applied vibrations sweeping from 10 to 2000 Hz at a peak level of 5 G without any performance degradation or fatiguing. In another alternative embodiment, the broadband surge protector 10 is constructed to withstand mechanical shock testing of a 30 G amplitude, three cycles in all three planes, without any performance degradation or fatiguing. In yet another alternative embodiment, the broadband surge protector 10 is constructed to withstand at least a thousand hours of corrosion testing (salt fog) without any performance degradation. In yet another alternative embodiment, the broadband surge protector 10 is constructed to withstand at least twenty-five severe thermal cycles (+85 C for one hour, −55 C for one hour) without any performance degradation or fatiguing. In yet another alternative embodiment, the broadband surge protector 10 is constructed to withstand at least ten days of humidity testing at 95% humidity and a temperature of 65 C without any performance degradation.

In an alternative embodiment of the present invention, a capacitor (not shown) is electrically coupled in series to the coaxial-through-section 12 to aid in reducing the throughput energy resulting from a surge flowing through the surge protector. In some extraordinary circumstances, the operating system requiring protection may be extremely sensitive to transients and therefore require even a lower level of throughput energy performance. In such rare extreme applications, a series capacitor used in conjunction with the helical aperture shorted stub surge protector 10 of the present invention can provide an additional level of surge protection and further reduce the throughput energy. Further, in another alternative embodiment, a series inductor coupled in series to the coaxial through-section 12 and terminating to a separate connecting interface may be implemented to permit the introduction of low level DC current (through the separate connecting interface) into the transmission line system for power requirements of transmission equipment. Only the connector 18,19 coupled to the inductor would carry current. The series capacitor would effectively decouple the second coaxial connector 18,19 of the coaxial through-section from the DC current.

The illustrated embodiment of the surge protector 10 shows that the helical aperture 36 is continuous for about five revolutions around the inner conductor 26 of the stub 14. However, in alternative embodiments of the present invention, the helical aperture 36 need only make at least one revolution around the inner conductor 26. In an alternative embodiment of the surge protector 10, where the aperture 36 is continuous about the inner conductor 26 for about two and a half revolutions the distance $D_1$ is 0.300 inch and the distance $D_2$ is 0.580. In such an alternative embodiment, the helical aperture is located such that high performance levels of return loss can be achieved at even a higher frequency range. For systems demanding even a higher level of performance regarding return loss, a inner conductor 26 having a helical aperture 36 continuous for about two and a half revolutions can be implemented to achieve about 30 dB return loss from 1500 MHz to 3400 MHz. In other alternative embodiments, the helical aperture 36 extends for at least approximately one-fifth of a length L of the inner conductor. In still other alternative embodiments of the present invention, the helical aperture ranges from extending for about one-forth to about three-fourths of the length L of the inner conductor. In still other alternative embodiments of the present invention, the inner conductor 26 of the stub 14 may contain more than one helical aperture or, alternatively still, the helical aperture may be segmented into more than one section.

The inner conductor length L and outer diameter $\phi$ can vary according to alternative embodiments of the present invention. For example the ratio of the outer diameter $\phi$ to the length L of the inner conductor 26 can range anywhere from about 0.10 to about 0.40. The thickness t of the wall of the inner conductor 26 can range between 0.050 inch to about 0.090 inch according to other embodiments of the present invention. The practical limitations of the manufacturing process and the current handling capabilities of the inner conductor material are some of the parameters which determine the boundaries of this range. The material in out of which the inner conductor 26 is constructed can also be varied according to other alternative embodiments of the present invention. For example, in alternative embodiments of the present invention, the inner conductor 26 is constructed out of phosphor bronze alloy 544 full hard material, beryllium copper B196 Alloy C, or brass ASTM B16 half hard, or any non-ferromagnetic material that would be suitable to carry a microwave signal and capable of carrying current.

In alternative embodiments, the present invention may be applied to surge protectors other than the illustrated tee-shaped surge protectors. For example, the curvilinear stub of the surge protector disclosed in commonly-owned U.S. Pat.

No. 5,892,602 entitled "Surge Protector Connector," incorporated herein by reference above, may be modified in this manner. In other alternative embodiments, the invention can be applied to other surge protector as well. For example, the invention can be implemented in a surge protector having a right-angle through-section geometry. In such an embodiment, the coaxial through-section incorporates a 90° bend at some point (generally at a mid-point) in the coaxial-through section. The inner conductor 26 of the stub 14 would be connected to the 90° coaxial-through section at the first end 30 of the inner conductor 26.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A surge protector, comprising:

a coaxial through-section having a first inner conductor and a first outer conductor;

a stub having a second inner conductor and a second outer conductor, the stub having a first end and a second end, the stub being coupled to the coaxial through-section, wherein the second inner conductor is conductively coupled to the first inner conductor at the first end of the stub and the second outer conductor is conductively coupled to the first outer conductor at the first end of the stub, the second inner conductor being substantially hollow and having at least one helical aperture disposed therein;

a charge elimination device conductively coupled between said second inner conductor and a grounding device; and a radio frequency short circuit bypass electrically coupled between said second inner conductor and said second outer conductor.

2. The surge protector of claim 1 further including a grounding device conductively coupled to the second outer conductor at the second end of the stub.

3. The surge protector of claim 2 wherein the charge elimination device is in conductive contact with said grounding device.

4. The surge protector of claim 1 wherein the coaxial through-section has a first and a second end, the surge protector further comprising:

a first end connector coupled to the first end of the coaxial through-section, the first connector being adapted to electrically couple the first end of the coaxial through-section to a first coaxial cable; and a second connector coupled to the second end of the coaxial through-section, the second connector being adapted to electrically couple the second end of the coaxial through-section to a second coaxial cable.

5. The surge protector of claim 1 wherein the charge elimination device comprises a lightning arrestor.

6. The surge protector of claim 5 wherein the lightning arrestor is a gas tube.

7. The surge protector of claim 1 wherein the bypass is a capacitance.

8. The surge protector of claim 7 wherein the capacitance is defined by a cylindrical member having a coating of dielectric material closely adjacent to an inner surface of said second outer conductor.

9. The surge protector of claim 8 further including a grounding device conductively coupled to the second outer conductor at the second end of the stub.

10. The surge protector of claim 1 wherein the helical aperture is continuous for at least one revolution around the second inner conductor.

11. The surge protector of claim 2 wherein one end of the charge elimination device has a coupling mechanism attached thereto being adapted to conductively engage the grounding device.

12. The surge protector of claim 11 wherein the coupling mechanism is a spring-finger clip.

13. The surge protector of claim 1 wherein the first inner conductor contains an internally threaded aperture disposed therein and the second inner conductor includes an externally threaded member being adapted to couple the stub to the internally threaded aperture of the first inner conductor.

14. A surge protector, comprising:

a coaxial through-section having a first inner and a first outer conductor, the coaxial-through section having a first end and a second end;

a first connector coupled to the first end of the coaxial through-section, the first connector being adapted to electrically couple the first end of the coaxial through-section to a first coaxial cable;

a second connector coupled to the second end of the coaxial through-section, the second connector being adapted to electrically couple the second end of the coaxial through-section to a second coaxial cable;

a stub having a second inner conductor, a second outer conductor, and a first end and a second end, the stub being coupled to the coaxial through-section, wherein the second inner conductor is conductively coupled to the first inner conductor at the first end of the stub and the second outer conductor is conductively coupled to the first outer conductor at the first end of the stub, the second inner conductor being substantially hollow and having a helical aperture disposed therein;

a charge elimination device conductively coupled between said second inner conductor and a grounding device; and a radio frequency short circuit bypass electrically coupled between said second inner conductor and said second outer conductor.

15. The surge protector of claim 14 further including a grounding device conductively coupled to the second outer conductor at the second end of the stub.

16. The surge protector of claim 15 wherein the charge elimination device is in conductive contact with said grounding device.

17. The surge protector of claim 14 wherein the charge elimination device comprises a lightning arrestor.

18. The surge protector of claim 17 wherein the lightning arrestor is a gas tube.

19. The surge protector of claim 14 wherein the RF bypass is a capacitance.

20. The surge protector of claim 19 wherein the capacitance is defined by a cylindrical member having a coating of dielectric material closely adjacent to an inner surface of said second outer conductor.

21. The surge protector of claim 14 wherein the helical aperture is continuous for at least one revolution around the second inner conductor.

22. The surge protector of claim 15 wherein one end of the charge elimination device has a coupling mechanism attached thereto being adapted to conductively engage the grounding device.

23. The surge protector of claim 22 wherein the coupling mechanism is a spring-finger clip.

24. The surge protector of claim 14 wherein the first inner conductor contains an internally threaded aperture disposed therein and the second inner conductor includes an externally threaded member being adapted to couple the stub to the internally threaded aperture of the first inner conductor.

25. A method of protecting a cable from electrical surges, while permitting both RF signals and DC current to flow through said cable, said method comprising:

interposing in said cable a surge protector including a coaxial through-section having a first inner conductor and a first outer conductor and a coaxial stub having a second inner conductor and a second outer conductor, the stub having a first end and a second end, the second inner conductor being conductively coupled to the first inner conductor at the first end of the stub, the second outer conductor being conductively coupled to the first outer conductor at the first end of the stub, the second inner conductor being substantially hollow and having a generally cylindrical outer wall and a helical aperture in the generally cylindrical outer wall of the second inner conductor;

conductively coupling a charge elimination device between said second inner conductor and said a device; and electrically coupling a radio frequency short circuit bypass between said second inner conductor and said outer conductor.

26. The method of claim 25 further including conductively coupling a grounding device to the second outer conductor at the second end of the stub.

27. The method of claim 25 wherein the RF bypass is a capacitance defined by positioning a cylindrical member having a coating of dielectric material closely adjacent to an inner surface of said second outer conductor.

* * * * *